April 26, 1927.
J. D. WIESE
1,626,572
DRAG ATTACHMENT FOR DISK CULTIVATORS OR HARROWS
Filed Dec. 22, 1925
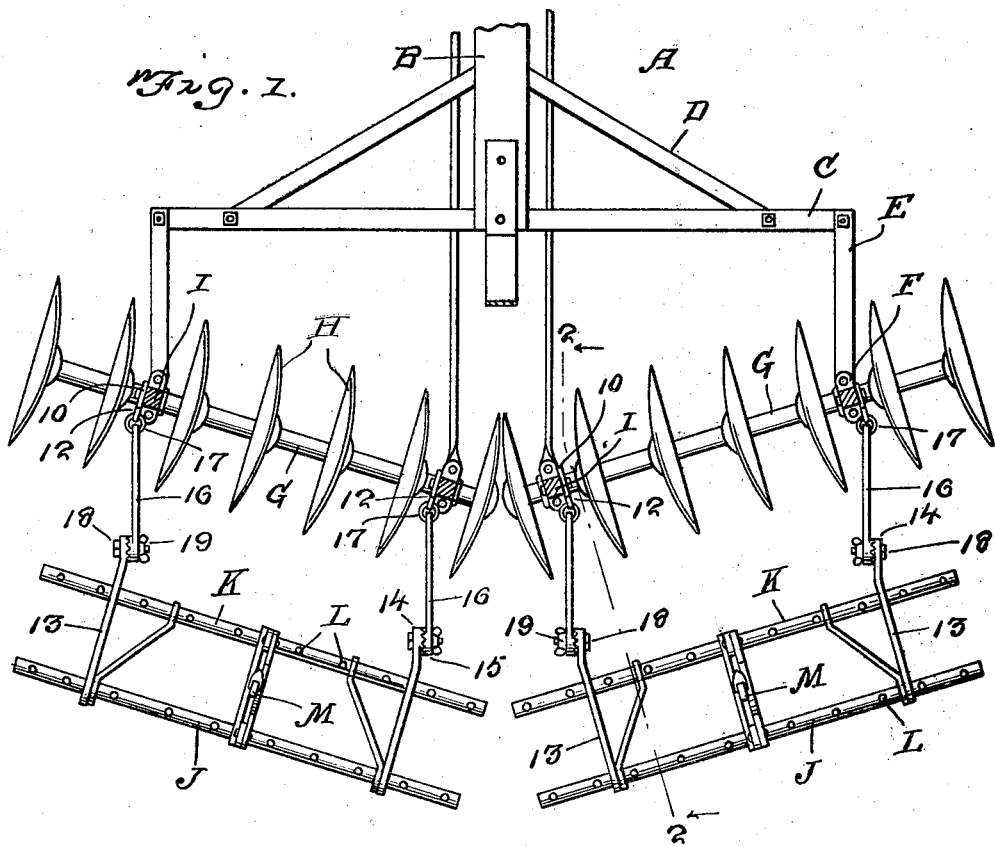
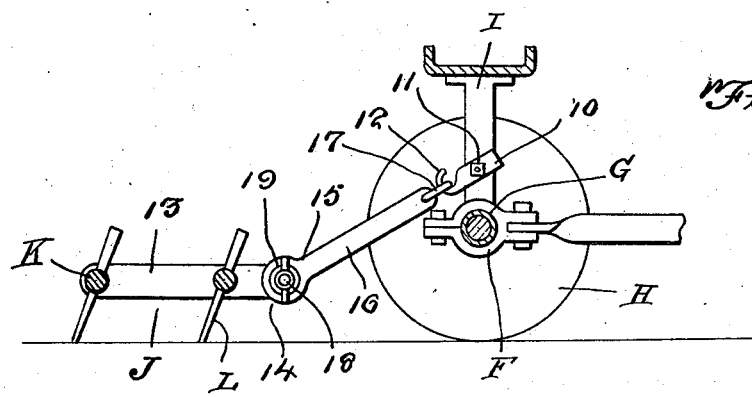
J. D. Wiese
INVENTOR Patented Apr. 26, 1927. 1,626,572

UNITED STATES PATENT OFFICE.

JOHN D. WIESE, OF MANSON, IOWA.

DRAG ATTACHMENT FOR DISK CULTIVATORS OR HARROWS.

Application filed December 22, 1925. Serial No. 77,058.

This invention relates to agricultural implements, particularly to devices for treating the ground preliminary to planting or seeding, and has for its object the provision of a novel drag attachment to a disk cultivator or harrow, the construction, arrangement and location of the parts being such that disconnection or connection may be made very quickly and easily whenever desired or necessary, adequate supporting means being provided for connecting the harrow members themselves to the disk structure.

An important object is the provision of an attachment of this character which embodies ordinary drag elements and peculiar coupling means connected therewith and adapted for connection with the disk harrow whereby the toothed harrows will trail along behind the disks and effectually break up the soil so that it will be rendered fit for seeding or sowing.

An additional object is to provide a device of this character which will be simple and inexpensive to manufacture, easy to apply, positive in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a plan view of the complete device, and

Figure 2 is a vertical detail in cross section on the line 2—2 of Figure 1 looking in the direction of the arrows.

Referring more particularly to the drawings, the letter A designates, generally, a disk harrow including a frame or tongue B with which is connected a transverse or cross member C reinforced by diagonal braces D and carrying arms E on which are mounted boxings F for the axles G carrying disks H which operate on the soil in a well known manner. Obviously, the boxings F are carried by standards I as is well known.

In carrying out the invention, I provide a pair of drags or toothed harrows J each of which is here represented as including elongated bars K suitably connected, carrying teeth or spikes L, and provided with lever means M whereby the angular position of the spikes or teeth may be adjusted.

In carrying out the invention, I provide mounting or connecting means for the drags J, the connecting means comprising clamping members 10 engaged upon the standards I which carry the boxings F for the disk carrying axles, these clamping members 10 being secured in place by any desired means such, for instance, as by means of bolts 11. These clamping members also carry or are formed with hooks 12 arranged, as shown. The drag includes or is provided with transverse members or arms 13 provided at their forward ends with enlarged radially toothed portions 14 engaged by correspondingly toothed enlarged portions 15 of bars 16 which have their forward ends apertured and carrying links or rings 17 detachably engageable upon the hook 12.

In applying the device, it is intended that the clamps 10 be permanently secured upon the standards I so that the ordinary disk harrow structure will always be ready to have the toothed drag device applied thereto.

The enlarged portions 14 and 15 of the arms 13 and 16 respectively are connected by clamping bolts 18 carrying wing, thumb or other suitable nuts 19 so that the adjusted position may be made to conform to certain requirements which might develop under certain conditions.

In the operation of the device, it is of course apparent that the harrow may be used in the ordinary manner without having the attachment applied thereto. However, when it is desired to drag the ground immediately subsequent to disking it is an extremely simple matter to engage the drags J upon the disk harrow structure by hooking the links 17 onto the hooks 12 carried by the standards I. When this is done, it is of course apparent that the drags J will trail behind the gangs of disks and effectually break up the soil, and in effect, pulverize it so as to render it absolutely fit for seeding or sowing. Clearly, by adjusting at the toothed portions 14 and 15 the angular position of the teeth with respect to the ground traveled over may be varied to meet different requirements. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In combination with a disk harrow including sets of disks adapted to be arranged at an angle, toothed harrows trailing behind the disk harrows in parallel relation thereto, the toothed harrows including forwardly extending arms having head portions at their forward ends, other arms vertically pivotally adjustably connected with the heads at the forward ends of the first named arms, links carried by the second named arms, and connecting hooks mounted on the disk harrow structure and detachably engaged by the links.

2. In combination with a disk harrow including sets of disks adapted to be arranged at an angle, toothed harrows trailing behind the disk harrows in parallel relation thereto, the toothed harrows including forwardly extending arms having head portions at their forward ends, other arms vertically pivotally adjustably connected with the heads at the forward ends of the first named arms, links carried by the second named arms, and connecting hooks mounted on the disk harrow structure and detachably engaged by the links, said second named arms having heads at their rear ends, said first and second named heads having their confronting faces formed with radial ribs, and clamping bolts passing through said heads for effecting angular adjustment of the first and second named arms with respect to one another for varying the position of the teeth of the harrows.

In testimony whereof I affix my signature.

JOHN D. WIESE.